(12) United States Patent
Watanabe et al.

(10) Patent No.: US 8,698,430 B2
(45) Date of Patent: Apr. 15, 2014

(54) VARIABLE SPEED SWITCH AND ELECTRIC POWER TOOL WITH THE VARIABLE SPEED SWITCH MOUNTED THERETO

(75) Inventors: Masahiro Watanabe, Anjo (JP); Takuya Kusakawa, Anjo (JP); Hidenori Nagasaka, Anjo (JP)

(73) Assignee: Makita Corporation, Anjo-shi (JP)

( * ) Notice: Subject to any disclaimer, the term of this patent is extended or adjusted under 35 U.S.C. 154(b) by 85 days.

(21) Appl. No.: 13/225,995

(22) Filed: Sep. 6, 2011

(65) Prior Publication Data

US 2012/0068633 A1 Mar. 22, 2012

(30) Foreign Application Priority Data

Sep. 17, 2010 (JP) ................................. 2010-209130
Oct. 6, 2010 (JP) ................................. 2010-226365

(51) Int. Cl.
*B60K 6/36* (2007.10)

(52) U.S. Cl.
USPC ................. 318/11; 318/3; 318/379; 318/139; 318/696; 173/3; 173/170; 173/11; 173/20; 173/217; 702/182; 702/183; 702/33; 702/34; 702/35; 200/61.85

(58) Field of Classification Search
USPC ............ 318/3, 379, 139, 696, 11; 173/2, 474, 173/11, 20, 171, 112, 176, 217, 170; 702/182, 183, 33, 34, 35; 200/61.85
See application file for complete search history.

(56) References Cited

U.S. PATENT DOCUMENTS

| 2003/0141765 | A1 | 7/2003 | Chu |
| 2006/0118315 | A1* | 6/2006 | Suzuki et al. ..................... 173/2 |
| 2007/0085496 | A1* | 4/2007 | Philipp et al. ................. 318/139 |
| 2009/0309519 | A1* | 12/2009 | Suzuki et al. ................. 315/314 |
| 2010/0163266 | A1* | 7/2010 | Matsunaga et al. ........... 173/217 |
| 2010/0206703 | A1* | 8/2010 | Puzio et al. ................. 200/61.85 |
| 2010/0206706 | A1* | 8/2010 | Buettner et al. ............. 200/400 |

FOREIGN PATENT DOCUMENTS

| JP | 06339875 A | * 12/1994 | ................ B25F 5/00 |
| JP | 07220563 A | * 8/1995 | ............ H01H 13/00 |
| JP | A-7-220563 | 8/1995 | |
| JP | 2003260675 A | * 9/2003 | ................ B25F 5/00 |

(Continued)

OTHER PUBLICATIONS

Feb. 4, 2013 Extended European Search Report issued in European Patent Application No. 11180339.1.

(Continued)

*Primary Examiner* — Shawki S Ismail
*Assistant Examiner* — Jorge Carrasquillo
(74) *Attorney, Agent, or Firm* — Oliff, PLC

(57) ABSTRACT

A variable speed switch includes a switch main body portion which is accommodated in a housing of an electric power tool and mounted to the housing so as to be capable of relative movement, and a load sensor which is provided in the switch main body portion and capable of outputting an electric signal in proportion to the amount of distortion caused by a pressing force. The switch operating portion is mounted on the surface of the housing so as to be capable of relative displacement with respect to the housing and transmits a pressing force applied to the switch operating portion to the load sensor, with the maximum displacement amount of the switch operating portion being set to equal to or less than 5 mm.

8 Claims, 10 Drawing Sheets

(56) References Cited

FOREIGN PATENT DOCUMENTS

| JP | A-2003-260675 | 9/2003 |
| JP | A-2004-230548 | 8/2004 |
| JP | A-2005-118956 | 5/2005 |
| JP | U-3139449 | 1/2008 |
| JP | 2008296323 A * | 12/2008 |
| JP | A-2010-158743 | 7/2010 |

OTHER PUBLICATIONS

Feb. 18, 2014 Office Action issued in Japanese Patent Application No. 2010-226365 (with translation).

* cited by examiner

VARIABLE SPEED SWITCH AND ELECTRIC POWER TOOL WITH THE VARIABLE SPEED SWITCH MOUNTED THERETO

This application claims priority to Japanese patent application serial numbers 2010-209130 and 2010-226365, the contents of which are incorporated herein by references.

BACKGROUND OF THE INVENTION

1. Field of the Invention

The present invention relates to a variable speed switch which is mounted to an electric power tool etc. and capable of outputting an electric signal for increasing and decreasing the amount of an electric power supplied to a motor of the electric power tool in proportion to the displacement amount of a switch operating portion. The present invention further relates to an electric power tool provided with the above variable speed switch and further provided with a wake-up switch configured to apply voltage to a control circuit of the motor to work the control circuit.

2. Description of the Related Art

Japanese Patent Application Laid-Open No. 2003-260675 discloses a variable speed switch in the prior art.

As shown in FIG. 12, a variable speed switch 100 according to the above-mentioned publication includes a trigger 102 operated by being pulled with a finger, and a switch main body portion 105 provided with a slide-type variable resistor (not shown) interlocked with the pulling operation of the trigger 102. The trigger 102 is provided with a support shaft 103 protruding rearwards (to the right as seen in the drawing), and the support shaft 103 is supported by a bearing 105j of the switch main body portion 105 so as to be slidable in the axial direction. Further, inside the switch main body portion 105, there is provided a spring 105b biased to return the trigger 102 to the original position (a leftward end position).

When the trigger is pulled against the force of the spring 105b, the variable speed switch 100 is turned on, resulting in a reduction in resistance value as the amount by which the trigger 102 is pulled increases. And, as a result of the reduction in the resistance value of the variable speed switch 100, the amount of electric power supplied to the motor of the electric power tool increases, resulting in an increase in the rotational speed of the motor. When the trigger 102 is returned to the original position by the force of the spring 105b, the variable speed switch 100 is turned off, and the amount of electric power supplied to the motor of the electric power tool is reduced to zero, thereby stopping the motor.

Generally, in order to suppress power consumption of the battery, a power source of the control circuit of the motor in an electric power tool is configured to be turned off when the electric power tool is not used. When the electric power tool is to be used, the wake-up switch is turned on, whereby voltage is applied to the control circuit, and the control circuit can work so as to increase or decrease the amount of electric power supplied to the motor in proportion to the amount by which the variable speed switch is pulled. When the amount by which the variable speed switch is pulled is reduced to zero, that is, when the finger is released from the variable speed switch, the control circuit turns off the power source thereof.

Generally, in an electric power tool as disclosed in Japanese Patent Application Laid-Open No. 2003-260675, a wake-up switch is incorporated into the variable speed switch. More specifically, as shown in FIG. 12, the variable speed switch 100 includes the trigger 102 operated by being pulled with a finger, the switch main body portion 105 provided with a slide-type variable resistor (not shown) interlocked with the trigger 102, and a wake-up switch (not shown) incorporated into the switch main body portion 105. As shown in FIG. 13, when the trigger 102 is pulled by a fixed amount L0 against the force of the spring 105b, the wake-up switch is turned on and the voltage is applied to the control circuit. When the trigger 102 is further pulled, the resistance value of the variable resistor varies in proportion to the pulling amount, and the control circuit increases or decreases the amount of electric power supplied to the motor as the resistance value varies.

However, in the variable speed switch 100 described above, the configuration is such that the resistance value of the variable resistor varies as the amount by which the trigger 102 is pulled increases or decreases, and thus it is necessary to set the movement amount (stroke) of the trigger 102 with respect to the switch main body 105 to be relatively large. This results in an increase in the size of the variable speed switch 100, and eventually the degree of freedom may be reduced when the variable speed switch 100 is incorporated into the electric power tool. Further, since the stroke of the trigger 102 with respect to the switch main body 105 is relatively large, the waterproof structure for the electric power tool with the variable speed switch 100 attached thereto may be rather complicated.

Further, in the above-described variable speed switch 100, when the trigger 102 is pulled by a fixed amount L0, the wake-up switch is turned on, and the voltage is applied to the control circuit. In case that a variable speed switch 100 is used in which the maximum pulling amount of the trigger 102 is smaller than the fixed amount L0, the wake-up switch cannot be turned on by the trigger 102 of the variable speed switch 100.

Thus, there is a need to reduce the displacement amount of the switch operation portion with respect to the switch main body, in order to improve the degree of freedom in the mounting of the variable speed switch and also to simplify a waterproof structure for the electric power tool.

Further, there is a need to provide a wake-up switch that can apply voltage to the control circuit of the motor, even when a variable speed switch is used in which the pulling amount of the trigger is small.

SUMMARY OF THE INVENTION

According to one construction, there is provided a variable speed switch which is mounted to an electric power tool and capable of outputting an electric signal for increasing or decreasing the amount of electric power supplied to a motor of the electric power tool in proportion to the displacement amount of a switch operating portion. The variable speed switch includes a switch main body portion accommodated in a housing of the electric power tool and mounted to the housing so as to be capable of relative movement, and a load sensor provided in the switch main body portion and capable of outputting an electric signal in proportion to the amount of distortion caused by a pressing force. The switch operating portion is mounted on a surface of the housing so as to be capable of relative displacement with respect to the housing and transmits a pressing force applied to the switch operating portion to the load sensor, with the maximum displacement amount of the switch operating portion being set to equal to or less than 5 mm.

According to this construction, the switch operating portion is capable of transmitting the pressing force applied to the switch operating portion to the load sensor, and the load sensor is capable of converting the amount of the distortion caused by the pressing force into an electric signal. In other words, the variable speed switch can output an electric signal in accordance with the pressing force applied to the switch operating portion, and eventually the amount of electric power supplied to the motor of the electric power tool can be increased or decreased by use of the electric signal.

Thus, the maximum displacement amount of the switch operating portion is theoretically equal to the maximum distortion amount of the load sensor, and the displacement amount (stroke) of the switch operating portion with respect to the switch main body portion can be reduced as compared with a conventional variable resistor-type switch. As a result, the size of the variable speed switch can be reduced and the degree of freedom with regard to the position of mounting can be improved.

Further, since the maximum displacement amount (stroke) of the switch operating portion is not more than 5 mm, it is possible, for example, to cover both the surface of the housing and the switch operating portion with film etc., thus simplifying the waterproof structure for the electric power tool.

According to another construction, the housing of the electric power tool includes a tubular housing main body and a handle portion radially protruding from a side surface of the housing main body, with the switch main body portion being attached to a proximal end portion of the handle portion.

This helps to reduce the stroke of the trigger of the variable speed switch, thereby improving operability of the electric power tool.

According to another construction, the housing of the electric power tool includes a tubular housing main body and a handle portion radially protruding from a side surface of the housing main body, and the switch main body portion is attached to a rear portion of the housing main body, and also, the switch operating portion is mounted to a rear end surface of the housing main body.

Thus, by pressing the rear end surface of the housing main body, it is possible to perform speed change operation, thereby improving the usability of the electric power tool.

According to another construction, the switch operating portion includes an operating portion main body disposed in the outer side of the housing, a shaft portion passed through an opening in the housing, and a load transmission portion transmitting a pressing force to the load sensor inside the housing. The shaft portion can be formed of an elastic material to seal the opening of the housing.

According to another construction, the switch operating portion includes an operating portion main body disposed in the outer side of the housing, a shaft portion passed through the opening of the housing, and a load transmission portion transmitting a pressing force to the load sensor inside the housing. The operating portion main body, the shaft portion, and the load transmission portion can be formed integrally of an elastic material, and the shaft portion can seal the opening of the housing.

In this way, the waterproof structure for the electric power tool is simplified, thereby reducing the cost.

According to another construction, there is provided an electric power tool provided with the variable speed switch and further provided with a wake-up switch, which is provided independently of the variable speed switch, configured to apply voltage to a control circuit of the motor to work the control circuit.

According to this construction, the wake-up switch is provided independently of the variable speed switch. In other words, the wake-up switch and the variable speed switch are not interlocked with each other.

Thus, even when a variable speed switch is used in which the displacement amount of the switch operating portion is very small, the wake-up switch can be reliably operated.

According to another construction, a switch other than the variable speed switch also serves as a wake-up switch.

Thus, there is no need to provide a wake-up switch separately, thereby reducing the cost.

According to another construction, the switch that serves as the wake-up switch is for switching between forward rotation and reverse rotation of the motor or an on-off switch for illumination.

Generally, the switch for switching between forward rotation and reverse rotation of the motor or the on-off switch for illumination is operated before pulling operation of the variable speed switch is performed. Therefore, by using these switches, it is possible to start up the control circuit before performing pulling operation of the variable speed switch.

According to this construction, it is possible to improve the degree of freedom in mounting the variable speed switch to the electric power tool, and to simplify the waterproof structure for the electric power tool.

Further, even when a variable speed switch is used in which an operation amount is small, it is possible to provide a wake-up switch for starting up the control circuit of the motor.

DETAILED DESCRIPTION OF THE INVENTION

Figure 1:
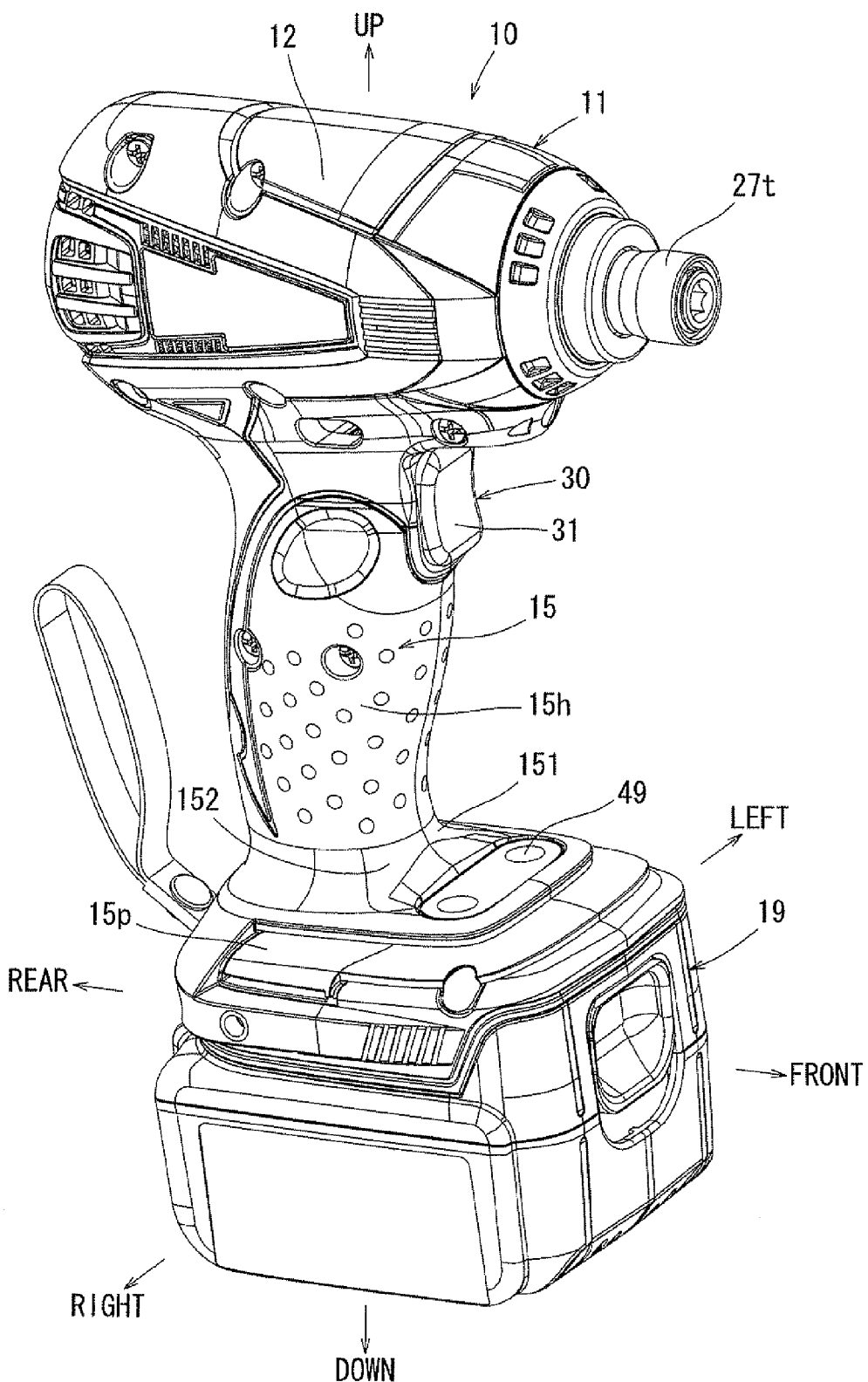
FIG. 1 is a general perspective view of an electric power tool provided with a variable speed switch according to one construction of the present invention.

Each of the additional features and teachings disclosed above and below may be utilized separately or in conjunction with other features and teachings to provide improved variable speed switch. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Hereinafter, a variable speed switch 30 according to one construction will be described with reference to FIGS. 1 to 11. A variable speed switch 30 according to this construction is for use in an impact driver 10 (hereinafter referred to as the electric power tool 10). The variable speed switch 30 is capable of outputting an electric signal for increasing or decreasing the amount of electric power supplied to a DC motor 20 of the electric power tool 10 in proportion to the displacement amount of a switch operating portion (trigger 31).

Hereinafter, the front, rear, right, left, upper, and lower sides in the diagrams corresponds to the front, rear, right, left, upper, and lower sides of the electric power tool 10.

Before describing the variable speed switch 30 in detail according to one construction, the electric power tool 10 will be briefly explained.

A housing 11 of the electric power tool 10 is formed in a hollow configuration, with the cross-section surface closed, by fit-engaging right-hand and left-hand half housing pieces with each other at a central position in the width direction. As shown in FIG. 1, the housing 11 includes a tubular housing main body 12, and a handle portion 15 formed so as to protrude radially (downwards) from a side portion (the lower portion in FIG. 1) of the housing main body 12.

Figure 2:
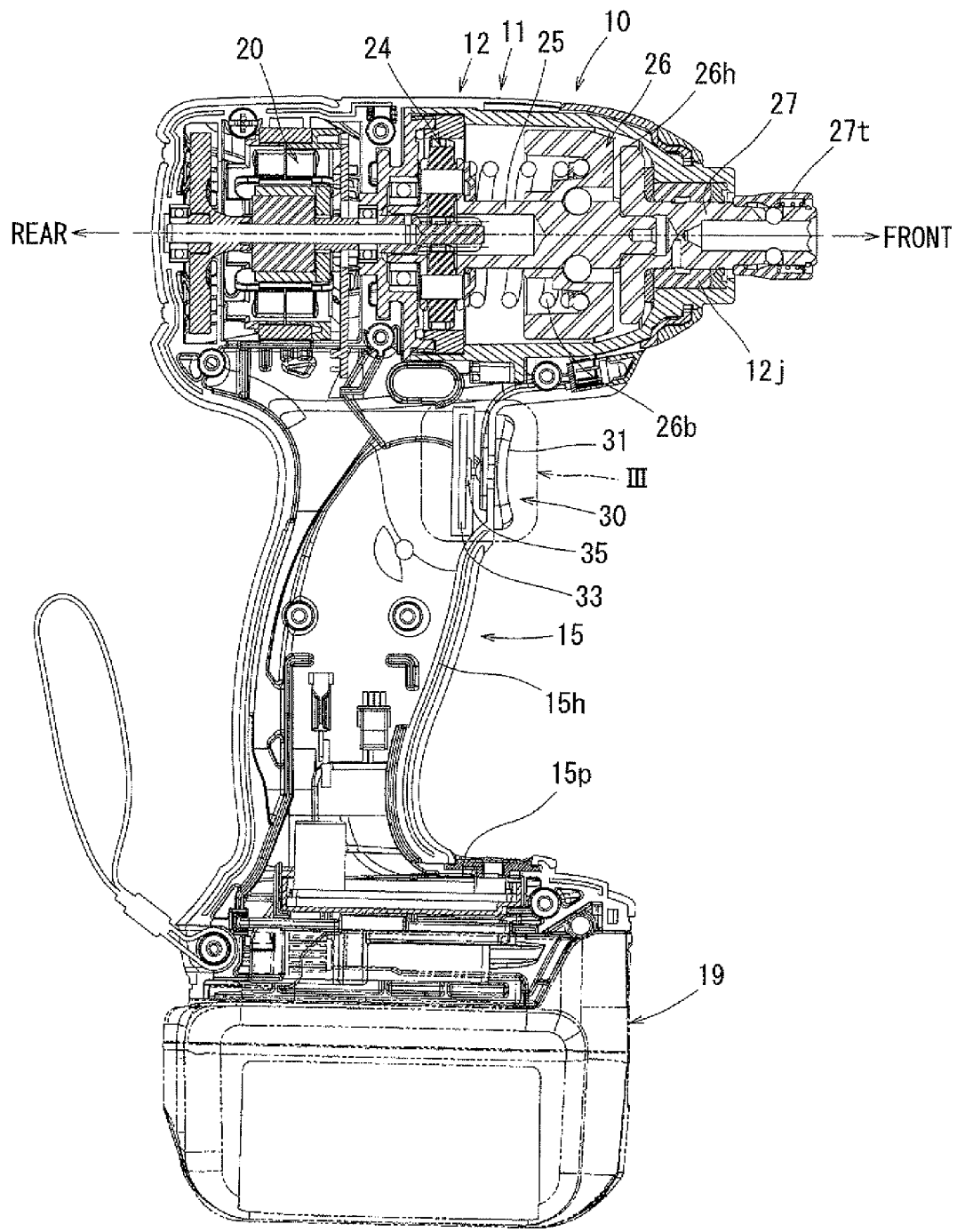
FIG. 2 is a general longitudinal sectional view of the electric power tool.

As shown in FIG. 2, there are coaxially accommodated in the housing main body 12 the DC motor 20, a planetary gear mechanism 24, a spindle 25, a striking force generation mechanism 26, and an anvil 27 in this order from the rear side. The DC motor 20 serves as a drive source of the electric power tool 10, and the rotational speed of the DC motor 20 is reduced by the planetary gear mechanism 24 before the rotation of the DC motor 20 is transmitted to the spindle 25. Then, the rotational force of the spindle 25 is converted to a rotary striking force by the striking force generation mechanism 26 provided with a hammer 26h and a compression spring 26b before being transmitted to the anvil 27. The anvil 27 is configured to rotate around an axis upon receiving the rotary striking force. Further, the anvil 27 is supported so as to be rotatable around the axis by a bearing 12j provided at the forward end of the housing main body 12, and also the anvil 27 is incapable of displacement in the axial direction.

At the forward end portion of the anvil 27, there is provided a chuck portion 27t for attaching a driver bit, socket bit, etc. (not shown).

The handle portion 15 of the housing 11 is grasped by a user when the electric power tool 10 is used. The handle portion 15 includes a grip portion 15h, and a battery connection portion 15p disposed on the protruding end (lower end) side of the grip portion 15h. The grip portion 15h is formed in a relatively small diameter so that the user can easily grasp the same, and the variable speed switch 30 according to this construction is mounted to the proximal end portion (the upper end portion) of the grip portion 15h.

The battery connection portion 15p of the handle portion 15 is formed so as to expand in the downward direction and also in the forward direction with respect to the grip portion 15h, and a connection portion (not shown) of a battery 19 is constructed to be engaged therewith while sliding backwards from the front side.

Figure 3:
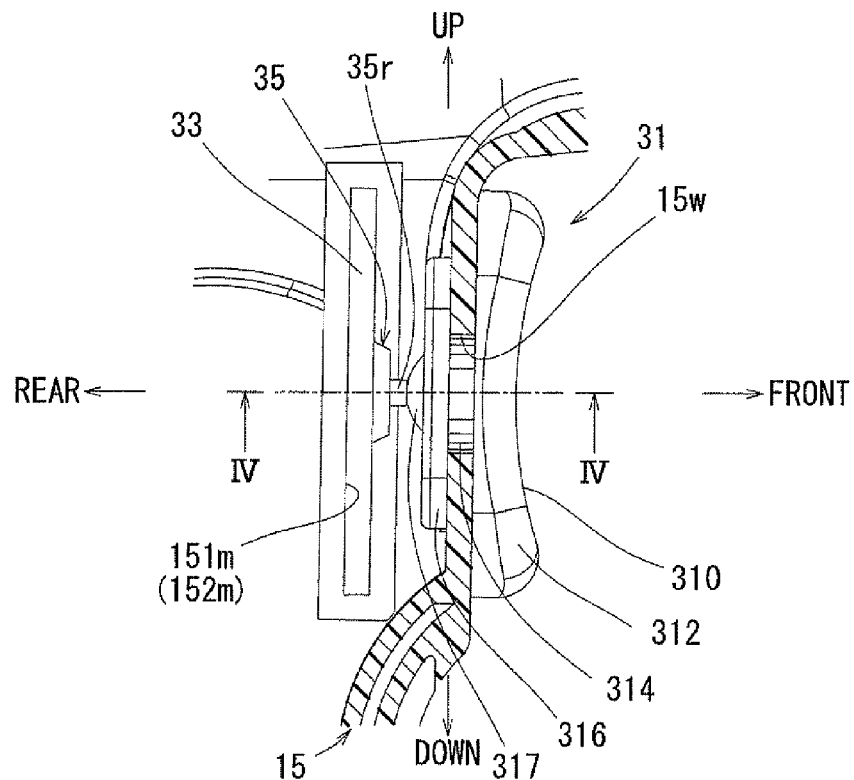
FIG. 3 is a side view of the variable speed switch.

As shown in FIGS. 2 and 3, the variable speed switch 30 includes a trigger 31 configured to be operated by the user by being pulled with a finger, a switch main body portion 33 accommodated in the handle portion 15 of the housing 11, and a load sensor 35 provided inside the switch main body portion 33 and configured to receive a pressing force from the trigger 31.

As shown in FIG. 3, the trigger 31 is provided with a trigger main body 312, a shaft portion 314, a flange portion 316, and a load transmission portion 317. The trigger main body 312 is disposed in the outer side of the handle portion 15, and the user can put his of her finger on the surface 310 of the trigger main body 312. As shown in FIG. 1, the trigger main body 312 is formed substantially as a rectangular plate. Further, as shown in FIG. 3, the surface 310 of the trigger main body 312 is formed in a concave and arcuate shape, so that a finger can be easily put thereon, and the back surface thereof is formed as a flat surface so as to be brought into contact with the surface of the handle portion 15.

Figure 4:
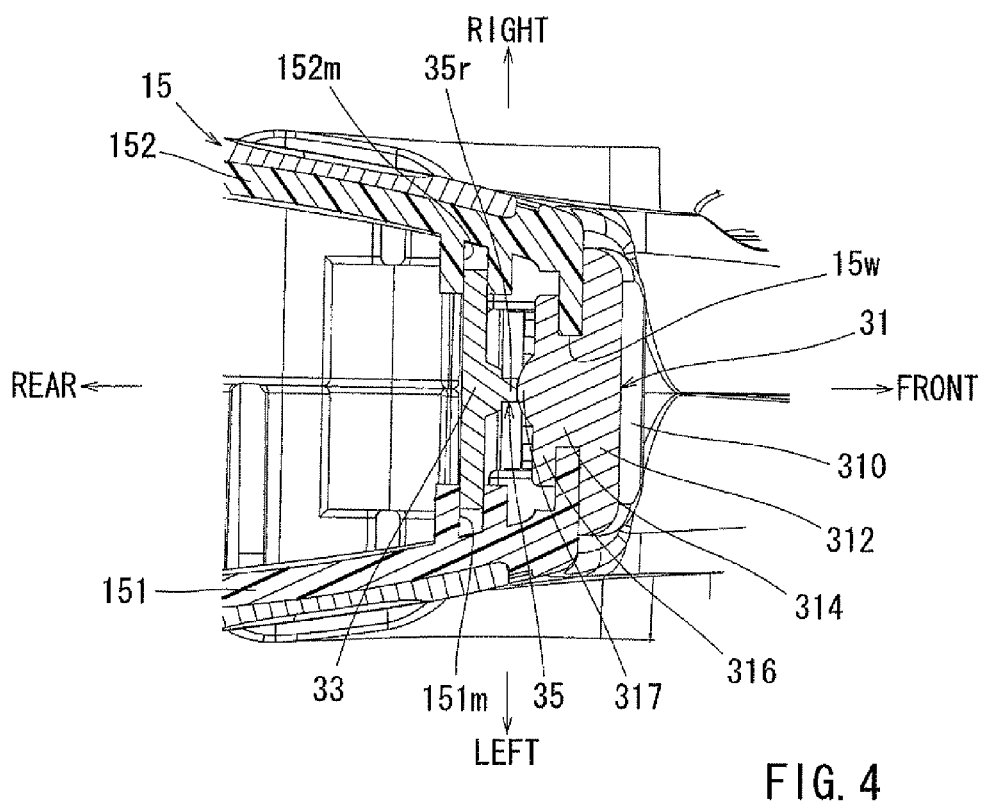
FIG. 4 is a sectional view taken along the arrow line IV-IV of FIG. 3.

A shaft portion 314 is formed at the center of the back surface of the trigger main body 312 so as to protrude at right angles with respect to the back surface. As shown in FIG. 4, the shaft portion 314 is inserted into an opening 15w of the handle portion 15. Further, as shown in FIGS. 3 and 4, the opening 15w of the handle portion 15 is formed at the central position of the upper portion of the front surface of the handle portion 15 and at a position where left and right handle members 151 and 152 are fit-engaged with each other. Thus, when the left and right handle members 151 and 152 is fit-engaged with each other, it is possible to pass the shaft portion 314 of the trigger 31 through the opening 15w of the handle portion 15. The shaft portion 314 is formed of an elastic material, and thus when it is passed through the opening 15w of the handle portion 15, the shaft portion 314 can seal the opening 15w. Alternatively, the configuration may be such that the shaft portion 314, the trigger main body 312, and the load transmission portion 317 are formed integrally of the elastic material, and the shaft portion 314 can seal the opening 15w.

At the end of the shaft portion 314, there is fixed in position, coaxially with the shaft portion 314, the flange portion 316 pressing the peripheral edge of the opening 15w of the handle portion 15 from the inner side of the handle portion 15. And, the semi-spherical load transmission portion 317 is provided coaxially with the shaft portion 314 at the center of the surface of the flange portion 316 (on the opposite side of the shaft portion 314).

In this way, the shaft portion 314 of the trigger 31 is passed through the opening 15w formed at the center of the front surface of the handle portion 15, so that the trigger 31 is attached to the front surface of the handle portion 15 so as to be capable of relative displacement in the axial direction (front-rear direction) of the shaft portion 314.

The switch main body portion 33 is an electric circuit board provided with a load sensor 35. As shown in FIGS. 2 and 3, it is fixed to the inner side of the handle portion 15 while located opposite the back surface of the trigger 31. The left and right handle members 151 and 152 of the handle portion 15 have longitudinally elongated grooves 151m and 152m at predetermined positions to be fit-engaged with the left-hand end edge and the right-hand end edge of the switch main body portion 33. And, the left-hand end edge and right-hand end edge of the switch main body portion 33 are fit-engaged with the vertically elongated grooves 151m and 152m of the left and right handle members 151 and 152, whereby the switch main body portion 33 is fixed to the inner side of the handle portion 15 while located opposite the trigger 31.

Figure 5:
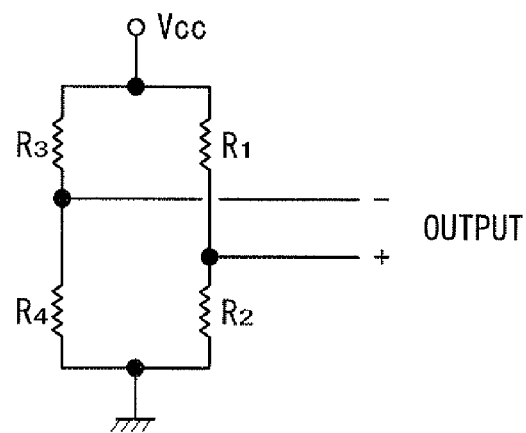
FIG. 5 is a schematic circuit diagram showing a load sensor used in the variable speed switch.
Figure 6:
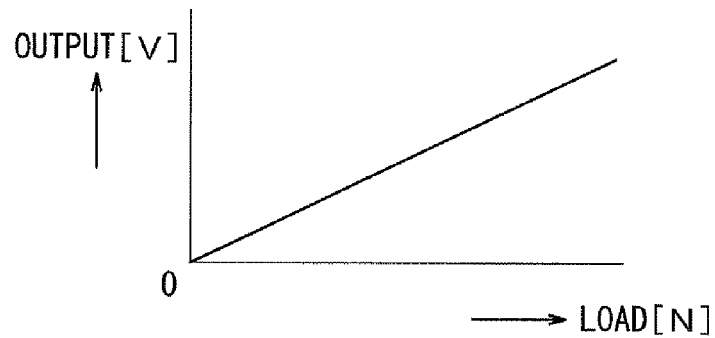
FIG. 6 is a graph showing the relationship between the load applied to the load sensor used in the variable speed switch and the output thereof.

On the surface of the switch main body portion 33, there is positioned a load sensor 35 which the load transmission portion 317 of the trigger 31 holds in contact with. The load sensor 35 is provided with a load receiving portion 35r, and the load receiving portion 35r receives a pressing force from the load transmission portion 317 of the trigger 31. The load receiving portion 35r of the load sensor 35 receives a pressing force from the load transmission portion 317 of the trigger 31, whereby the load sensor 35 is distorted, and the resistance value of the load sensor 35 varies in proportion to the distortion amount. A resistor bridge circuit shown in the schematic diagram of FIG. 5 shows an equivalent circuit of the load sensor 35, and a resistance ratio varies in proportion to the distortion amount. Thus, when a predetermined voltage is applied to a power source terminal of the bridge circuit from the electric circuit of the switch main body portion 33, a voltage signal in proportion to the pressing force (distortion amount) is output from an output terminal as shown in FIG. 6.

Therefore, when the trigger 31 is pulled, the pressing force applied to the trigger 31 is applied to the load receiving portion 35r of the load sensor 35 from the load transmission portion 317 of the trigger 31, and then the load sensor 35 (the variable speed switch 30) outputs a voltage signal in proportion to the pressing force.

In this construction, the maximum displacement amount when the trigger 31 is pulled is set to 5 mm or less.

In this construction, the trigger 31 and the trigger main body 312 correspond to the switch operating portion and the operating portion main body, respectively.

The output signal of the variable speed switch 30 is input to a control circuit (not shown) of the electric power tool 10. Based on the output signal (voltage signal) of the variable speed switch 30, the control circuit adjusts the electric power supplied to the DC motor 20 by a PWM control. That is, when the trigger 31 of the variable speed switch 30 is pulled by the user, the pressing force applied to the trigger 31 increases, and the output voltage of the variable speed switch 30 increases, whereby the electric power supplied to the DC motor 20 increases. As a result, the rotational speed of the DC motor 20 increases.

By contrast, when the pressing force applied to the trigger 31 weakens, the output voltage of the variable speed switch 30 decreased, whereby the electric power supplied to the DC motor 20 decreases. As a result, the rotational speed of the DC motor 20 decreases.

In the variable speed switch 30 according to this construction, the trigger 31 transmits the pressing force applied thereto to the load sensor 35, and the load sensor 35 converts the amount of distortion caused by the pressing force to an electric signal. In other words, the variable speed switch 30 outputs an electric signal in proportion to the pressing force applied to the trigger 31, and the amount of electric power supplied to the DC motor 20 of the electric power tool 10 can be increased or decreased by the electric signal.

As a result, the maximum displacement amount of the trigger 31 is theoretically equal to the maximum distortion amount of the load sensor 35, and, as compared with the conventional variable resistor-type variable speed switch, the displacement amount (stroke) of the trigger 31 with respect to the switch main body portion 33 can be greatly reduced. As a result, the size of the variable speed switch 30 can be reduced, and the degree of freedom with regard to the mounting position for the variable speed switch 30 can be improved.

Further, since the maximum displacement amount (stroke) of the trigger 31 is not more than 5 mm, the waterproof structure for the electric power tool 10 can be simplified as shown in FIG. 3.

Figure 7:
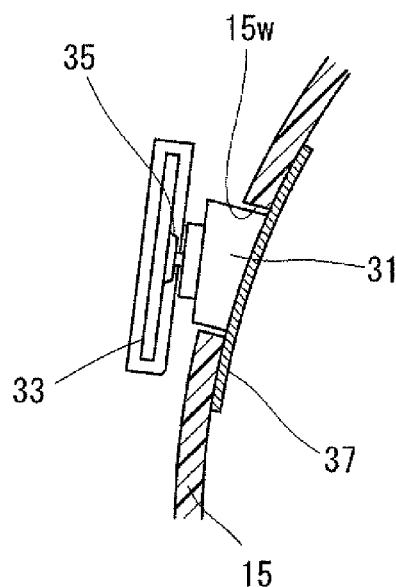
FIG. 7 is a schematic side view of a variable speed switch according to another construction.

The above construction is not restricted to the above-described example and various changes may be made without departing from the scope of the invention. In the above construction as shown in FIG. 3, the trigger 31 of the variable speed switch 30 includes the trigger main body 312, the shaft portion 314, the flange portion 316, and the load transmission portion 317, and, by passing the shaft portion 314 through the opening 15w of the handle portion 15, the trigger 31 can be attached to the surface of the handle portion 15 so as to be capable of relative displacement with respect to the handle portion. FIG. 7 shows another construction in which the opening 15w through which the trigger 31 is passed is formed in the front surface of the handle portion 15, and the trigger 31 is fixed to the back side (inside the housing) of an elastic material such as a rubber plate 37, etc. while the opening 15w is covered with the rubber plate 37. This helps to further simplify the waterproof structure.

Figure 8:
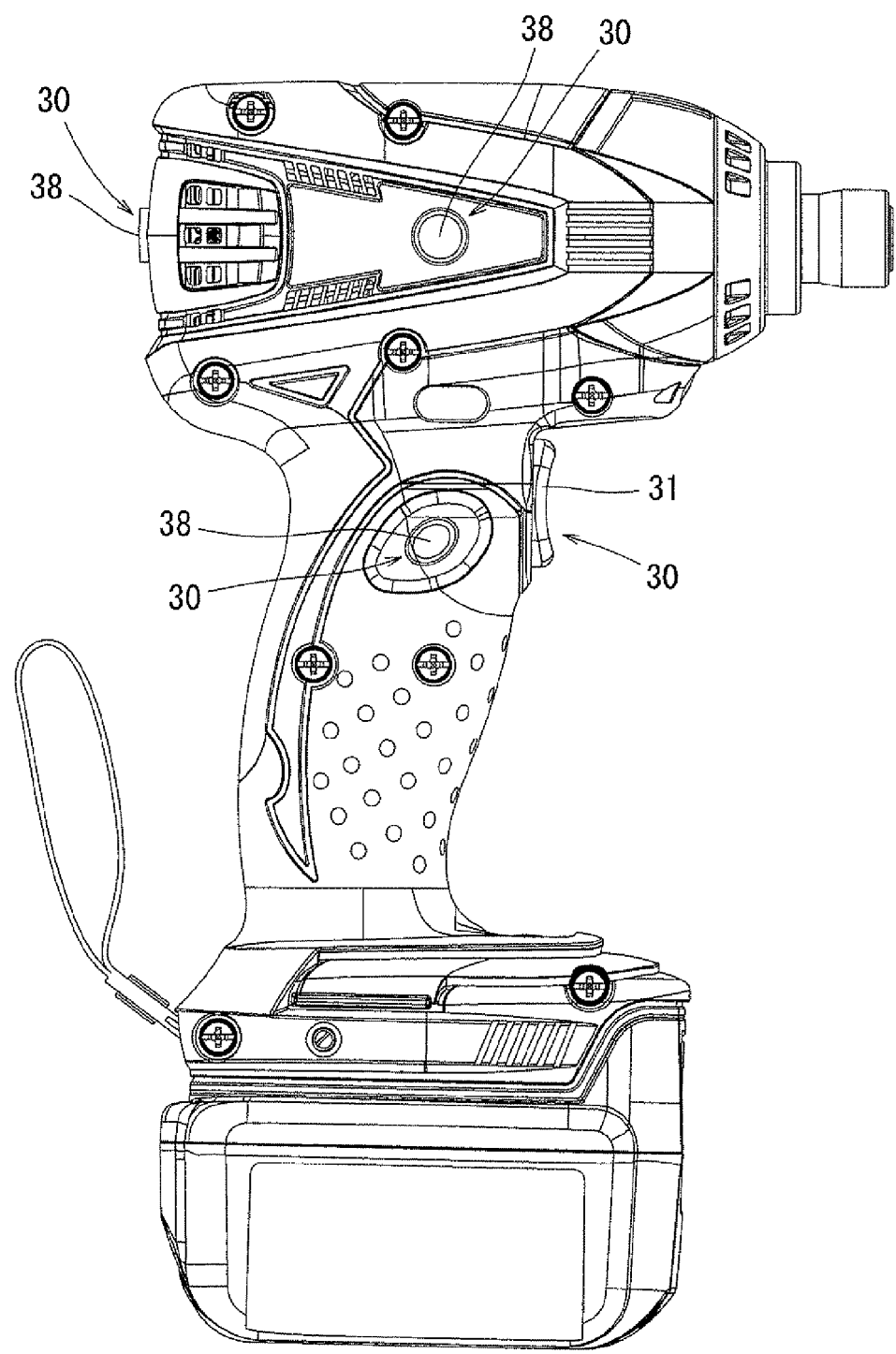
FIG. 8 is a side view showing an electric power tool provided with a variable speed switch according to another construction.

Further, in the above construction, the trigger-type variable speed switch 30 is disposed on the upper portion of the front surface of the handle portion 15 of the electric power tool 10. However, as shown in FIG. 8, it is also possible to provide a pushbutton-like switch operating portion 38 instead of the trigger 31, and to install the variable speed switch 30 at the rear portion of the housing main body 12 to arrange the switch operating portion 38 on the rear end surface of the housing main body 12. In this construction, by pressing the rear end surface of the housing main body 12, it is possible to perform speed change operation in the electric power tool 10, thereby improving the usability of the electric power tool 10.

Further, as shown in FIG. 8, it is also possible to arrange the switch operating portion 38 on the side surface of the housing main body 12, or on the side surface of the handle portion 15.

Hereinafter, the electric power tool 10 according to another construction will be described with reference to FIG. 1 and FIGS. 9 to 11.

The electric power tool 10 according to this construction is an impact driver (a rotary striking tool) using a DC brushless motor 20 (hereinafter referred to as the DC motor 20) as a drive source.

As shown in FIG. 1, the electric power tool 10 includes the tubular housing main body portion 12, and the handle portion 15 formed so as to protrude from the lower portion of the housing main body portion 12. The handle portion 15 includes the grip portion 15h grasped by the user when the electric power tool 10 is used, and the battery connection portion 15p disposed on the lower side (end side) of the grip portion 15h. Further, at the proximal end portion of the grip portion 15h, there is provided the variable speed switch 30 which the user operate by pulling it with his or her finger. Further, the battery connection portion 15p of the handle portion 15 is provided with the connection mechanism (not shown) to which the battery 19 is connected.

In the rear portion of the housing main body portion 12, there is accommodated the DC motor 20. Further, in front of the DC motor 20, there are accommodated a driving apparatus (not shown) including a planetary gear mechanism and a striking force generation mechanism which increase the rotational force of the DC motor 20. And, the output shaft of the driving apparatus is connected to a tool attachment portion (the chuck portion) 27t attached to the forward end position of the housing main body portion 12.

Figure 9:
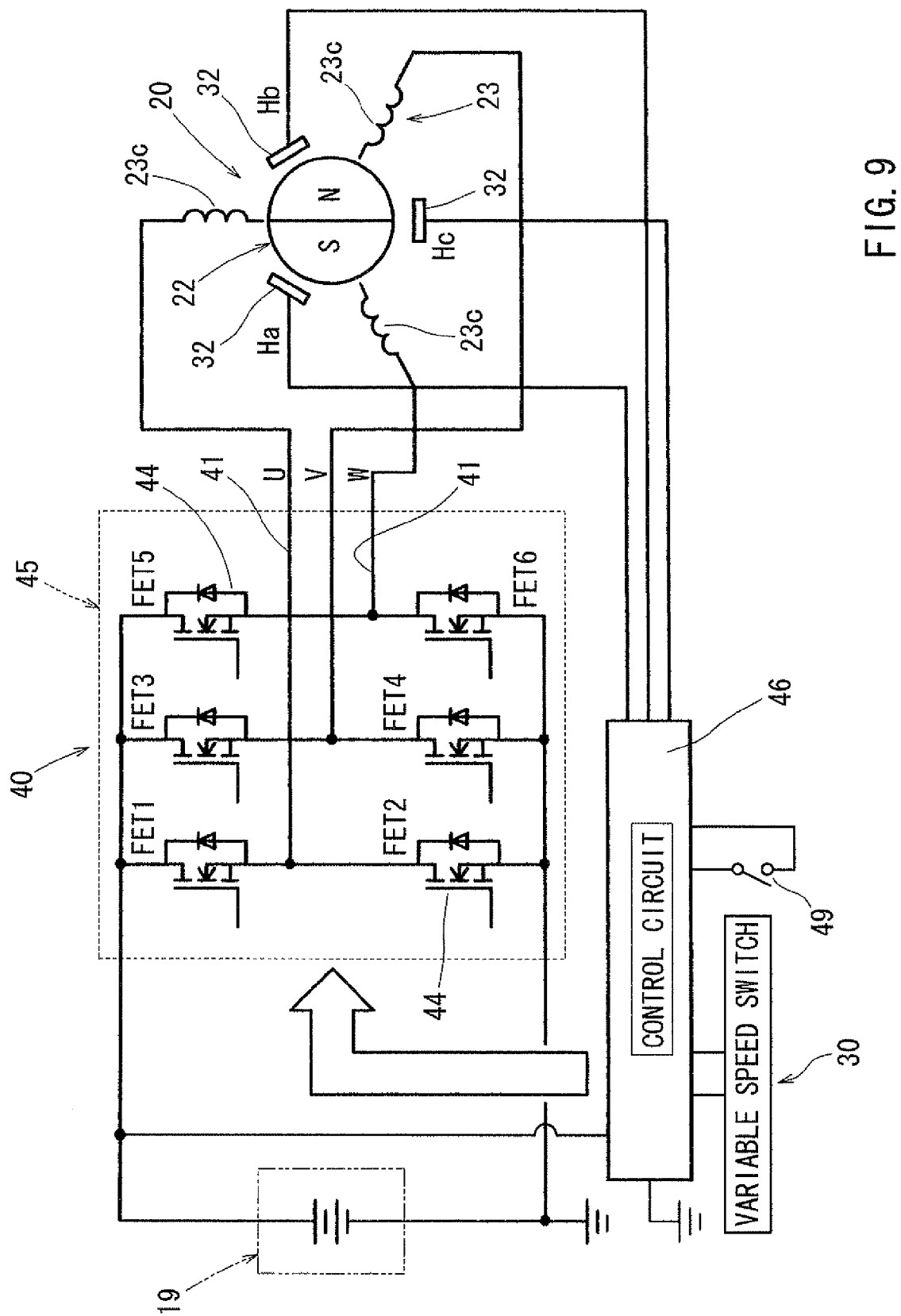
FIG. 9 is a motor drive circuit diagram for the electric power tool.

As shown in FIG. 9, etc., the DC motor 20 includes a rotor 22 provided with a permanent magnet, a stator 23 provided with driving coils 23c, and three magnetic sensors 32 for detecting the positions of magnetic poles of the rotor 22. The magnetic sensors 32 are mounted to an electric circuit board (not shown) provided at the rear end portion of the stator 23 at an interval of 120 degrees so as to surround the rotor 22. Further, on the electric circuit board, there are provided a three-phase bridge circuit 45 of a motor driving circuit 40 described below.

The motor driving circuit 40 drives the DC motor 20, and as shown in FIG. 9, the motor driving circuit 40 is provided with the three-phase bridge circuit 45 including six switching elements 44, and a control circuit 46 configured to control the switching elements 44 of the three-phase bridge circuit 45 according to an electric signal from the variable speed switch 30.

The three-phase bridge circuit 45 is provided with three (U-phase, V-phase, and W-phase) output lines 41, and the output lines 41 are connected to corresponding driving coils 23c (U-phase, V-phase, and W-phase) of the DC motor 20. Further, three magnetic sensors 32 are positioned to line at 60 degrees with respect to corresponding two of the three driving coils 23c of the DC motor 20.

Field effect transistors (FET) are used as the switching elements 44 of the three-phase bridge circuit 45, for example.

As shown in FIG. 1, the variable speed switch 30 includes the trigger 31 which the user operates by pulling it by his or her finger, a switch main body portion (not shown) accommodated in the handle portion 15, and a load sensor (not shown) which is provided in the switch main body portion and configured to receive a pressing force from the trigger 31. The load sensor is distorted by the pressing force received from the trigger 31, and is configured to output a voltage signal in proportion to the distortion amount. Thus, when pulling operation is performed on the trigger 31, the pressing force applied to the trigger 31 is applied to the load sensor, and a signal (voltage signal) is output in proportion to the pressing force.

As shown in FIG. 9, the output signal of the variable speed switch 30 (the voltage signal of the load sensor) is input to the control circuit 46 of the electric power tool 10.

Here, the maximum pulling amount of the trigger 31 of the variable speed switch 30 is set to approximately several mm, and the trigger 31 corresponds to the switch operating portion of this construction.

The control circuit 46, which includes an electronic component such as a micro computer and IC's etc., controls the switching elements 44 of the three-phase bridge circuit 45 according to the voltage signal of the variable speed switch 30 (the pulling amount of the trigger 31). Further, the control circuit 46 is provided with a wake-up switch 49 configured to apply voltage to the control circuit 46 to work.

Figure 10:
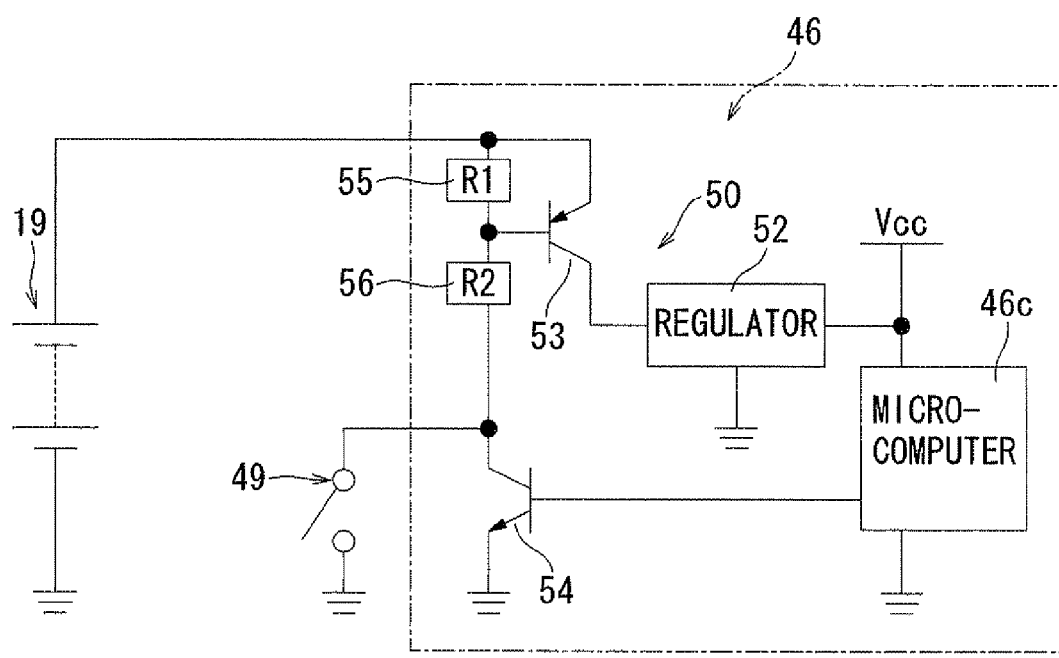
FIG. 10 is a power source circuit diagram showing the control circuit of the electric power tool.

As shown in FIG. 1, the wake-up switch 49 is mounted on the upper surface of the battery connection portion 15p of the handle portion 15, and also serves as an on-off switch for illuminating the electric power tool 10. The wake-up switch 49 can be kept being switched on only while it is being pressed. Further, the wake-up switch 49 is connected to a power source circuit 50 of the control circuit 46, as shown in FIG. 10.

The power source circuit 50 supplies a constant voltage to a microcomputer 46c of the control circuit 46. Further, the power source circuit 50 is provided with a regulator 52 for adjusting the voltage, a first transistor 53 configured to turn on and off the regulator 52, a second transistor 54 configured to operate the first transistor 53 according to a signal from the microcomputer 46c to the base of the second transistor 54, and a first resister 55 and a second resistor 56 for applying the voltage to the base of the first transistor 53. The wake-up switch 49 is provided in parallel with the second transistor 54.

Initially, in the above construction, the first transistor 53 and the second transistor 54 are being turned off. Then, when the wake-up switch 49 is pressed (turned on), an electric current flows from the first resistor 55 and the second resistor 56 to the wake-up switch 49. As a result, a divided voltage by the first resistor 55 and the second resistor 56 is applied to the base of the first transistor 53, and the first transistor 53 turns on (bring into conduction). As a result, the regulator 52 is turned on, and a constant voltage is applied to the microcomputer 46c, whereby the microcomputer 46c starts up. When it starts up, the microcomputer 46 applies a constant voltage to the base of the second transistor 54 to turn on the second transistor 54. Eventually, even when the wake-up switch 49 is turned off after that, the first transistors 53, 54 and the regulator 52 remain to be turned on.

By PWM control, the microcomputer 46c adjusts the electric power supplied to the DC motor 20 according to the output signal of the variable speed switch 30. That is, when pulling operation is performed on the trigger 31 of the variable speed switch 30, and the pressing force applied to the trigger 31 is thereby increased, the output voltage of the variable speed switch 30 increases, and the electric power supplied to the DC motor 20 is increased by the microcomputer 46c. As a result, the rotational speed of the DC motor 20 increases.

By contrast, when the pressing force applied to the trigger 31 weakens, the output voltage of the variable speed switch 30 decreases, and the electric power supplied to the DC motor 20 decreases. As a result, the rotational speed of the DC motor 20 decreases.

Further, when the pressing force ceases to be applied to the trigger 31 and a predetermined time has passed, the microcomputer 46c turns off the second transistor 54, whereby the first transistor 53 and the regulator 52 are turned off. As a result, the power source is not applied to the microcomputer 46c (the control circuit 46).

In other words, when the electric power tool 10 is not used, the power source of the control circuit 46 (microcomputer 46c) can be forced to turn off so as to effectively utilize the electric power of the battery 19. Further, by performing a pressing operation of the wake-up switch 49, it is possible to quickly start up the microcomputer 46c of the control circuit 46, making it possible to use the electric power tool 10.

In the electric power tool 10 according to this construction, the wake-up switch 49 is provided separately from the variable speed switch 30. In other words, the wake-up switch 49 and the variable speed switch 30 are not interlocked with each other, and the wake-up switch 49 is provided independently of the variable speed switch 30.

Thus, even in the case that an electric power tool 10 is provided with a variable speed switch 30 (the switch operating portion) in which the displacement amount of the trigger 31 is very small, it is possible to reliably operate the wake-up switch 49.

Further, since the wake-up switch 49 also serves as the on-off switch for illumination, there is no need to provide a wake-up switch 49 separately, thereby reducing the cost. Further, the on-off switch for illumination is generally operated before pulling operation of the variable speed switch 30 is performed. Therefore, by using the on-off switch for illumination also as the wake-up switch 49, it is possible to start up the control circuit 46 (the microcomputer 46c) before performing pulling operation on the variable speed switch 30.

Further, the variable speed switch 30 is provided with a load sensor capable of outputting an electric signal in proportion to the amount of distortion caused by a pressing force, and thus, it is possible to make the displacement amount of the trigger 31 (the switch operating portion) of the variable speed switch 30 very small, thereby improving the degree of freedom with regard to the mounting position for the variable speed switch 30.

Figure 11:
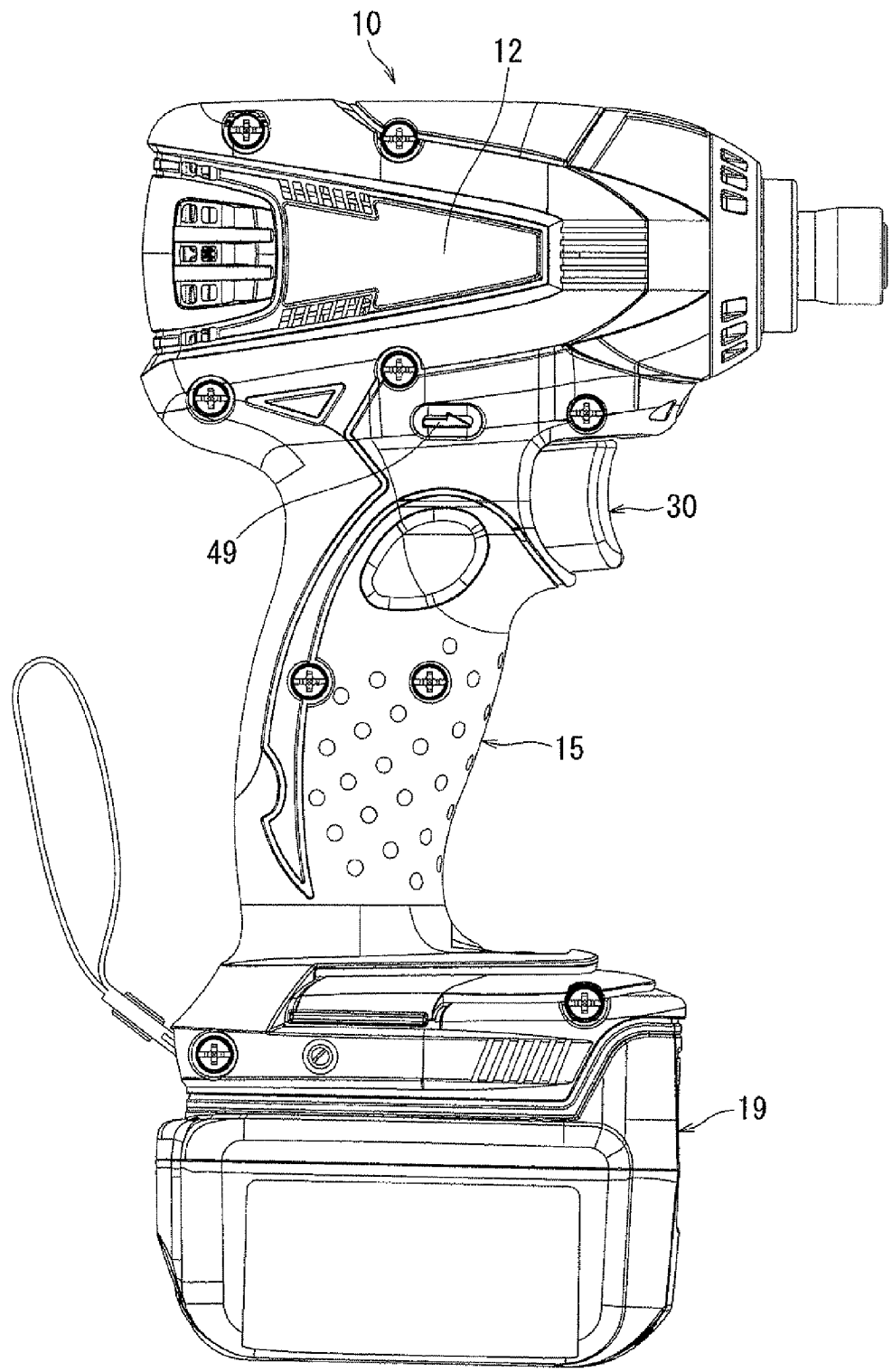
FIG. 11 is a general side view of an electric power tool according to another construction.
Figure 12:
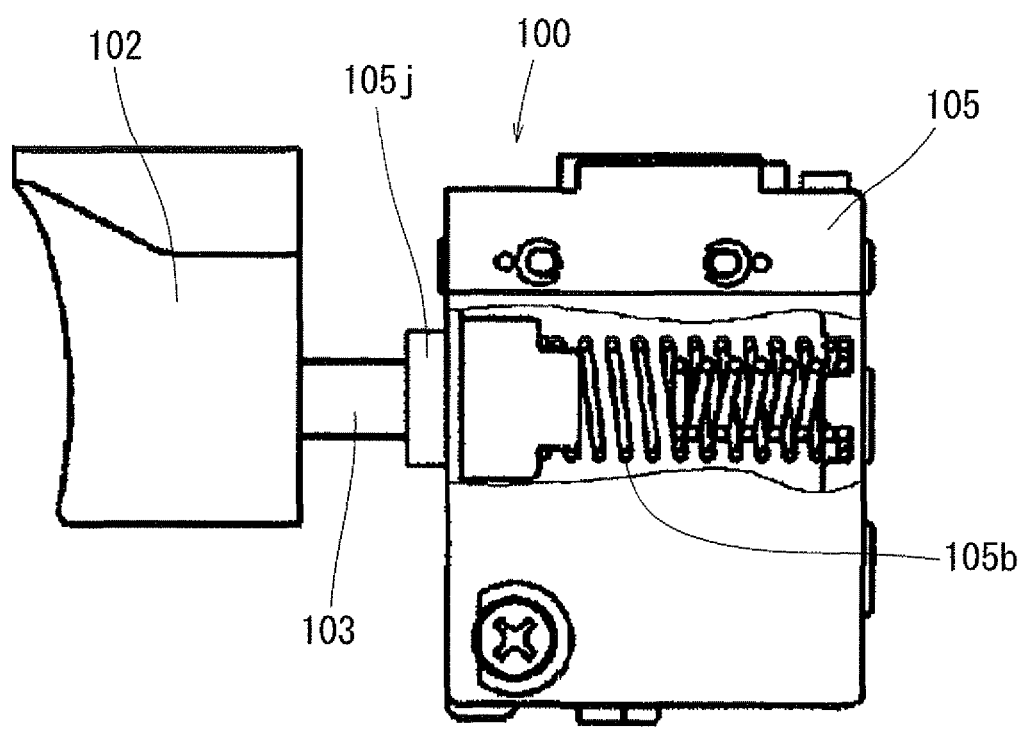
FIG. 12 is a side view of a variable speed switch in an electric power tool in the prior art.
Figure 13:
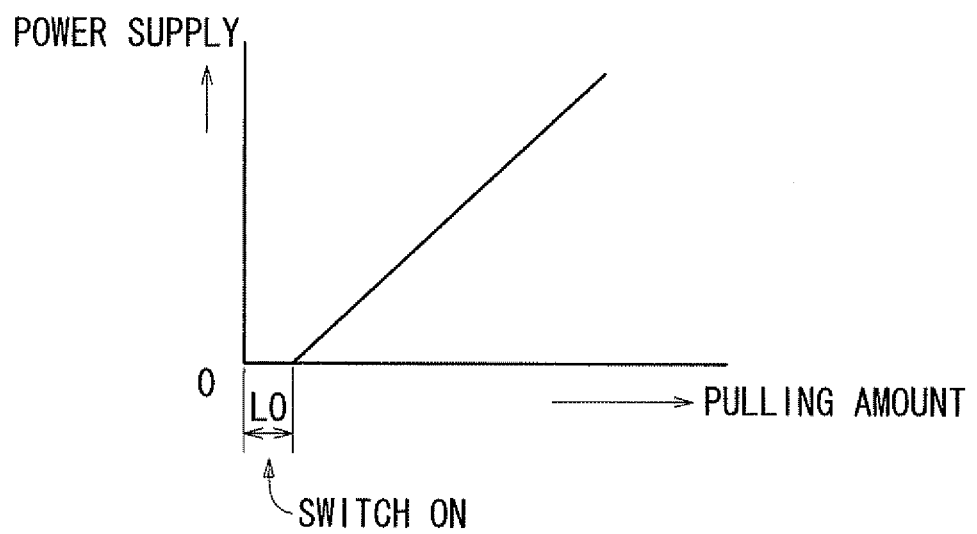
FIG. 13 is a graph showing the operation of the variable speed switch of the electric power tool in the prior art.

The above construction is not restricted to the above-described example and various changes may be made without departing from the scope of the invention. In the above construction, the wake-up switch 49 serves as the on-off switch for illumination, it is also possible for the wake-up switch 49 to serve as switching between forward rotation and reverse rotation of the motor, as shown in FIG. 11. Further, it is also possible for the wake-up switch 49 to serve as switching between fast rotation and slow rotation, etc.

We claim:

1. A variable speed switch which is mounted to an electric power tool and capable of outputting an electric signal for increasing or decreasing the amount of electric power supplied to a motor of the electric power tool in proportion to a displacement amount of a switch operating portion, the variable speed switch comprising:
   a switch main body portion accommodated inside a housing of the electric power tool and mounted to the housing such that the switch main body portion is not relatively moved with respect to the housing; and
   a load sensor provided in the switch main body portion and capable of outputting an electric signal in proportion to the amount of distortion caused by a pressing force;
   a wake-up switch that is switched on only while pressed down and provided separately from the variable speed switch and configured to apply voltage to a control circuit of the motor in order to work the control circuit, wherein
   the switch operating portion is mounted on a surface of the housing so as to be capable of relative displacement with respect to the housing and transmits the pressing force applied to the switch operating portion to the load sensor, with the maximum amount of the relative displacement of the switch operating portion being set to equal to or less than 5 mm,
   the control circuit is configured such that after the wake-up switch is switched on, voltage continues to be applied to the control circuit while the variable speed switch is being operated, and when the operation of the variable speed switch stops, voltage is not applied to the control circuit; and
   the wake-up switch is configured not to be interlocked with the variable speed switch.

2. The variable speed switch according to claim 1, wherein:
   the housing of the electric power tool includes a tubular housing main body and a handle portion radially protruding from a side surface of the housing main body; and
   the switch main body portion is attached to a proximal end portion of the handle portion.

3. The variable speed switch according to claim 1, wherein:
   the housing of the electric power tool includes a tubular housing main body and a handle portion radially protruding from a side surface of the housing main body;
   the switch main body portion is attached to a rear portion of the housing main body; and
   the switch operating portion is mounted on a rear end surface of the housing main body.

4. The variable speed switch according to claim 1, wherein:
   the switch operating portion includes an operating portion main body disposed in the outer side of the housing, a shaft portion passed through an opening provided in the housing, and a load transmission portion transmitting a pressing force to the load sensor inside the housing; and
   the shaft portion is formed of an elastic material and seals the opening of the housing by the shaft portion being attached around a circumference of the opening of the housing.

5. The variable speed switch according to claim 1, wherein:
   the switch operating portion includes an operating portion main body disposed in the outer side of the housing, a shaft portion passed through an opening provided in the housing, and a load transmission portion transmitting a pressing force to the load sensor inside the housing; and
   the operating portion main body, the shaft portion, and the load transmission portion are integrally formed of an elastic material, and the shaft portion seals the opening of the housing by the shaft portion being attached around a circumference of the opening of the housing.

6. The variable speed switch according to claim 1, wherein:
   the switch operating portion is disposed in an opening provided in the housing; and
   the opening is covered with an elastic material which the switch operating portion holds in contact with.

7. The electric power tool according to claim 1, wherein a switch other than the variable speed switch also serves as the wake-up switch.

8. The electric power tool according to claim 7, wherein the switch serving as the wake-up switch is for switching between forward rotation and reverse rotation of the motor or for an on-off switch for illumination.

* * * * *